US005203459A

United States Patent [19]

Wade

[11] Patent Number: 5,203,459

[45] Date of Patent: Apr. 20, 1993

[54] PREPACKAGED ORAL MEDICATION SERVING APPARATUS AND METHOD

[76] Inventor: Leslie C. Wade, 19415 Enchanted Oaks Dr., Spring, Tex. 77388

[21] Appl. No.: 699,502

[22] Filed: May 14, 1991

[51] Int. Cl.[5] ..................... B65D 69/00; A21D 10/02; A47J 43/28

[52] U.S. Cl. .................................... 206/572; 426/115; 30/326

[58] Field of Search ................. 30/326, 142, 141, 149; 206/216, 219, 229, 568, 570, 572; 426/134, 115, 112

[56] References Cited

U.S. PATENT DOCUMENTS

| | | | |
|---|---|---|---|
| D. 93,644 | 10/1934 | Adler | 30/326 |
| 1,277,635 | 9/1918 | Nimmer | 30/326 X |
| 3,154,418 | 10/1964 | Lovell et al. | 206/497 X |
| 3,360,121 | 12/1967 | Zoeller et al. | 30/326 X |
| 3,386,837 | 6/1968 | Arnot | 426/112 |
| 3,428,460 | 2/1969 | Ely | 426/112 X |
| 3,618,751 | 11/1971 | Rich | 426/115 X |

FOREIGN PATENT DOCUMENTS

| | | | |
|---|---|---|---|
| 471558 | 2/1951 | Canada | 30/142 |
| 3503167 | 8/1986 | Fed. Rep. of Germany | 30/142 |
| 2622424 | 5/1989 | France | 30/326 |
| 924178 | 4/1963 | United Kingdom | 426/134 |

*Primary Examiner*—Paul T. Sewell
*Assistant Examiner*—Beth Anne Cicconi
*Attorney, Agent, or Firm*—Kenneth A. Roddy

[57] ABSTRACT

An apparatus and method of providing and administering medicants to persons who have little or no control over the muscles of their mouth or, for other reasons, cannot swallow pills. A generally rectangular prepackaged serving container has a concave recessed mixing chamber, a flat serving surface extending forwardly from the mixing chamber, and a handle portion extending rearwardly from the mixing chamber. The mixing chamber contains a measured amount of food product. A flat mixing spatula is removably received along the top surface of the serving container and has a head portion substantially covering the contents of the mixing chamber. A removable flexible cover is peelably attached to the top surfaces of the serving container and the spatula and forms an air tight seal for the serving container and its contents. In use, the cover is peeled off the serving container and the spatula is removed. An oral medication in the form of a crushed pill or powder is placed into the mixing chamber and is thoroughly mixed with the food product using the spatula. The spatula is then inserted into the mixture at the rear of the mixing chamber and pushed forward to transfer the mixture onto the serving surface at the forward end of the serving container. The serving surface at the forward end of the serving container with the mixture thereon is placed in the recipient's mouth and the mixture is wiped off on the inside of the recipient's cheek or onto their tongue.

10 Claims, 2 Drawing Sheets

PREPACKAGED ORAL MEDICATION SERVING APPARATUS AND METHOD

BACKGROUND OF THE INVENTION

1. Field of the Invention

This invention relates generally to dispensers and serving devices, and more particularly to an apparatus and method of providing and administering medicants to persons who have difficulty swallowing pills which utilizes a prepackaged serving container having a concave recessed mixing chamber and a flat, generally rectangular, serving surface.

2. Brief Description of the Prior Art

Heretofore it has been very difficult to administer oral medicants to persons who have difficulty swallowing pills, such as in the case of infants, elderly persons, paralyzed persons, and heart attack and stroke victims. Some patients have lost the capacity to remove the contents from the bowl of a conventional spoon with the lips and/or tongue, others have psychological or physical difficulty swallowing whole pills, and others do not want to be medicated and will fake swallowing a pill and later spit it out. In these situations, nurses usually administer crushed pills in a food substance.

The usual practice in administering oral medication to these individuals is to crush and/or mix the oral medication in with spoon-size servings of food products having a pleasant taste, such as applesauce or jelly in a medicine cup. The small dosage of the mixture is placed on a tongue depressor, the tongue depressor is placed in the person's mouth, and the mixture is wiped off on the inside of the person's cheek or onto their tongue.

The above described method utilizes a medicine cup and a wooden tongue depressor. Due to the inefficiency of the mixing and serving utensils, the dosage is not always accurate and wastage of the medication results. It also requires that the mixing medium be refrigerated. The procedure is time consuming and often not sanitary.

There are several patents which disclose various covered spoon devices. However, once uncovered, they are used in the manner of a conventional spoon, and would not be suitable for use in administering medicants to persons who have little or no control over the muscles of their mouth or difficulty in swallowing.

Tunick, U.S. Pat. No. 1,708,456 discloses a folding paper spoon which in the unfolded condition has a folding handle with a bowl at one end and a disk at the opposite end and is used for packaging pre-measured amounts of medical powders. The handle is folded in the middle and the disk snaps fits onto the bowl to cover and seal the bowl containing the powder.

Miner, U.S. Pat. No. 2,389,530 discloses a compartment measure having a bowl-like end divided into compartments by a plurality of transverse partitions of predetermined capacity, a scale marked intermediate portion and a handle portion. A flat gate member is slidably connected to the device to selectively cover the compartments.

Kellerman, U.S. Pat. No. 3,287,806 discloses a spoon having a peelable cover. The device has a bowl portion containing a measured amount of material, a handle portion, and a thin flexible sheet cover is removably secured over the bowl.

Ushkow et al, U.S. Pat. Nos. 3,662,463 and 3,911,578 disclose a spoon having a bowl portion containing a measured amount of material and either a thin flexible sheet cover which is removably sealed over the bowl, or a rigid plastic cover which snap fits over the bowl. The handle may be removably attached to the bowl or may be formed integral therewith.

The present invention is distinguished over the prior art in general, and these patents in particular by a generally rectangular prepackaged serving container having a concave recessed mixing chamber, a flat, generally rectangular, serving surface extending forwardly from the mixing chamber, and a handle portion extending rearwardly from the mixing chamber. The mixing chamber contains a measured amount of food product. A flat generally rectangular mixing spatula is removably received along the top surface of the serving container and has a head portion substantially covering the contents of the mixing chamber. A removable flexible cover is peelably attached to the top surfaces of the serving container and the spatula and forms an air tight seal for the serving container and its contents.

The present invention is particularly useful in administering medicants to persons who have little or no control over the muscles of their mouth or, for other reasons, cannot swallow pills. In use, the cover is peeled off the serving container and the spatula is removed. The oral medication in the form of a crushed pill or powder is placed into the mixing chamber and is thoroughly mixed with the food product using the spatula. The spatula is then inserted into the mixture at the rear of the mixing chamber and pushed forward to transfer the mixture onto the serving surface at the forward end of the serving container. The serving surface at the forward end of the serving container with the mixture thereon is placed in the recipient's mouth and the mixture is wiped off on the inside of the recipient's cheek or onto their tongue.

SUMMARY OF THE INVENTION

It is therefore an object of the present invention to provide an apparatus and method of administering oral medications to persons who have little or no control over the muscles of their mouth or, for other reasons, cannot swallow pills.

It is another object of this invention to provide an apparatus and method of administering oral medications whereby oral medications may be mixed with a food product having a pleasant taste.

Another object of this invention is to provide an apparatus and method for quickly, easily, and efficiently administering oral medications.

Another object of this invention is to provide an apparatus for administering oral medications which contains a pleasant tasting food product and does not require refrigeration.

Another object of this invention is to provide a self-contained prepackaged apparatus for administering oral medications which contains a pleasant tasting food product, and a mixing spatula.

A further object of this invention is to provide an apparatus for administering oral medications which has a rectangular serving surface which allows a mixture of a pleasant tasting food product and oral medication to be placed thereon and wiped off inside the cheek or onto the tongue of a recipient having difficulty swallowing pills.

A still further object of this invention is to provide a disposable apparatus for administering oral medications which is simple in construction and economical to manufacture.

Other objects of the invention will become apparent from time to time throughout the specification and claims as hereinafter related.

The above noted objects and other objects of the invention are accomplished by an apparatus and method of providing and administering medicants to persons who have little or no control over the muscles of their mouth or, for other reasons, cannot swallow pills. A generally rectangular prepackaged serving container has a concave recessed mixing chamber, a flat, generally rectangular, serving surface extending forwardly from the mixing chamber, and a handle portion extending rearwardly from the mixing chamber. The mixing chamber contains a measured amount of food product. A flat, generally rectangular mixing spatula is removably received along the top surface of the serving container and has a head portion substantially covering the contents of the mixing chamber. A removable flexible cover is peelably attached to the top surfaces of the serving container and the spatula and forms an air tight seal for the serving container and its contents.

In use, the cover is peeled off the serving container and the spatula is removed. The oral medication in the form of a crushed pill or powder is placed into the mixing chamber and is thoroughly mixed with the food product using the spatula. The spatula is then inserted into the mixture at the rear of the mixing chamber and pushed forward to transfer the mixture onto the serving surface at the forward end of the serving container. The serving surface at the forward end of the serving container with the mixture thereon is placed in the recipient's mouth and the mixture is wiped off on the inside of the recipient,s cheek or onto their tongue.

DESCRIPTION OF THE PREFERRED EMBODIMENT

Figure 1:
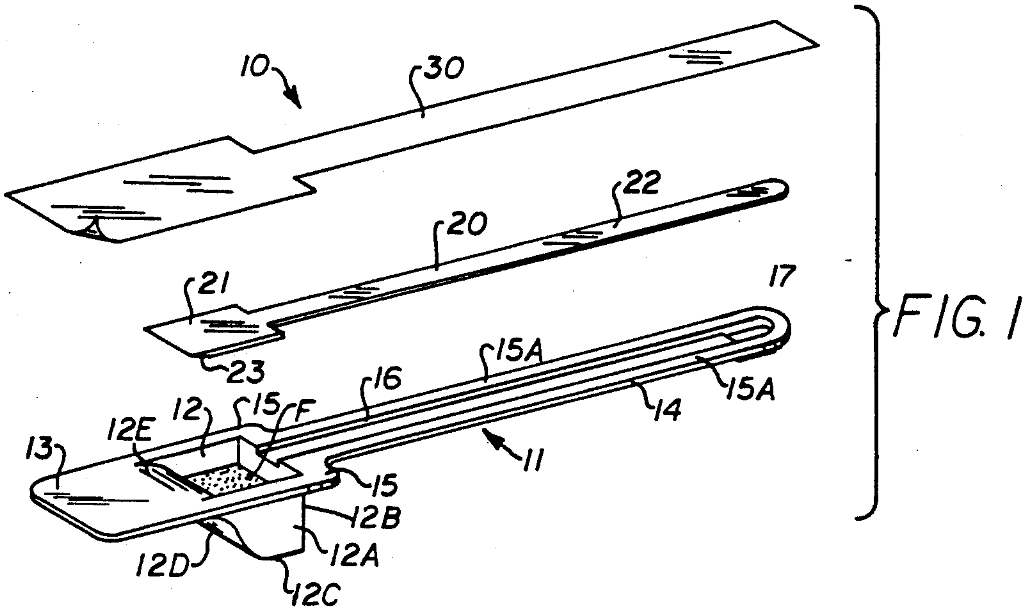
FIG. 1 is an exploded view of a preferred serving container in accordance with the present invention.
Figure 2:
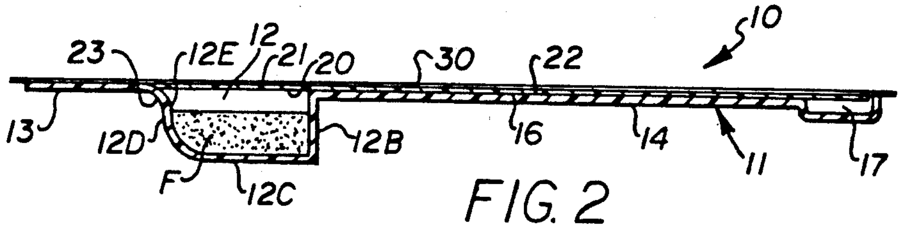
FIG. 2 is a longitudinal cross section view of the serving container in the assembled condition.
Figure 3:
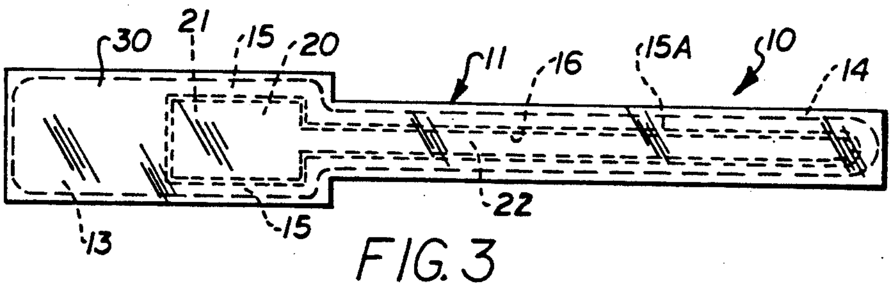
FIG. 3 is a top plan view of the serving container in an assembled condition.

Referring to the drawings by numerals of reference, there is shown in FIGS. 1, 2, and 3, a preferred apparatus 10 for serving oral medications to persons having little or no control of muscles of their lips and mouth or, for other reasons, cannot swallow pills. The apparatus includes a serving container 11, a mixing spatula 20, and a thin flexible cover 30.

The serving container 1; is a generally rectangular molded member having a having a concave recessed portion defining a mixing chamber 12. A flat, generally rectangular, portion extends axially from the forward end of the mixing chamber 12 to define a serving surface 13, and a narrow rectangular handle portion 14 extends from the rearward end of the mixing chamber. The width of the mixing chamber 12 is smaller than the width of the serving surface 13 to define a flat sealing surface 15 which surrounds the top opening of the mixing chamber.

Figure 4:
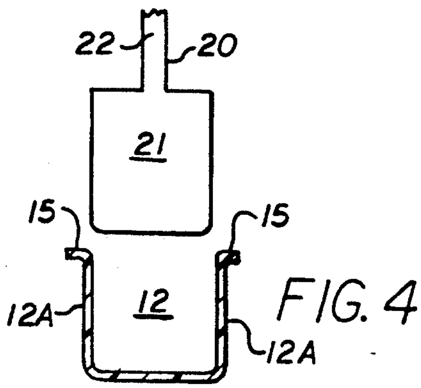
FIGS. 4 is a transverse cross section through the mixing chamber of the serving container with the spatula member shown above the chamber.

The mixing chamber 12 has contiguous opposed side walls 12A, a rear wall 12B, a bottom wall 12C, and a curved front wall 12D. The front wall 12D extends from the bottom wall 12C to the serving surface 13 in a smooth, generally S-shaped curve and forms a rounded shoulder 12E at its juncture with the serving surface 13. The bottom corners of the mixing chamber 12 are slightly rounded (FIG. 4).

The handle portion 14 is provided with a central narrow longitudinal recess 16 which extends from the rear wall 12B of the mixing chamber and may be rounded at the rearward end. The width of recess 16 is smaller than the width of the handle portion 14 to define a continuous extension 15A of the flat sealing surface 15 which surrounds the top opening of the mixing chamber. A small depression 17 may be formed in the bottom surface of the recess 16 for purposes described hereinafter.

The mixing spatula 20 is a generally rectangular flat planar member having a rectangular head portion 21 and a narrrow rectangular handle portion 22 extending axially therefrom. The width of the rectangular head portion 21 is slightly less than the width of the mixing chamber 12 to be slidably received therein and its length is approximately the same length as the length of the open top of the mixing chamber. The width of the handle portion 22 of the mixing spatula 20 is slightly smaller than the width of the recess 16 to be slidably received therein. The forward or bottom edge of the head portion 21 may be angled slightly relative to the longitudinal axis a indicated at 23. The bottom corners of the spatula head 21 are rounded to conform to the rounded bottom corners of the mixing chamber so that all the contents of the mixing chamber can be efficiently and completely transferred from the mixing chamber 12 by the head 21 of the spatula 20.

In the assembled condition, the mixing spatula 20 fits onto the top of the serving container 11 with its handle portion 22 received in the recess 16 of the handle portion 14 of the serving container and the head portion 21 substantially covering the open top end of the mixing chamber 12. The angled surface 23 of the head portion 21 allows for a close fit on the rounded shoulder 12E at the top of the mixing chamber 12. The rear portion of the spatula handle 22 is spaced above the small depression 17 formed in the bottom surface of the recess 16 of the handle portion 14. When the rear end of the spatula handle 22 is pressed down, the head portion 21 of the spatula will be raised above the mixing chamber 12 so that it can be easily grasped and removed.

The thin flexible cover 30 is formed of a generally rectangular strip of foil or other suitable material such as paper or cellophane. The cover 30 is cut to fit over the flat spatula and sealing surfaces 15 and 15A and is secured thereto with a suitable adhesive such that it can be peeled off. The outer periphery of the cover extends beyond the sealing surfaces of the serving container.

The mixing chamber 12 contains a predetermined amount of food product F, such as applesauce or jelly. Preferrably the mixing chamber is sized to contain one-half teaspoon of the food, product. The cover 30 seals the assembly and maintains the top surfaces of the serving container 11 including the serving surface 13 and the mixing spatula 20 in a sanitary condition. The sealed cover also eliminates the need to refrigerate the contents of the mixing chamber 12.

METHOD OF USE

Referring now additionally to FIGS. 5–8, the method of using the serving apparatus in administering medicants to persons who have little or no control over the muscles of their mouth or, for other reasons, cannot swallow pills, will be described.

Figure 5:
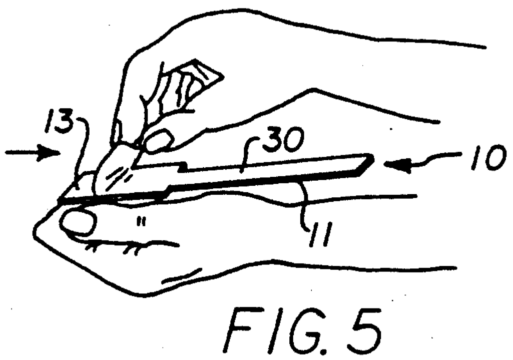
FIGS. 5–8 are pictorial views illustrating the method of using the serving container in accordance with the present invention.
Figure 6:
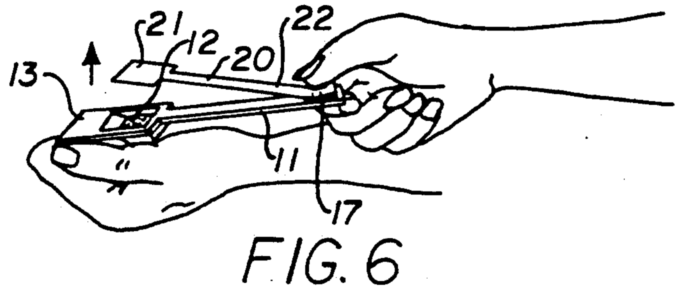

To use the serving apparatus, the cover 30 is peeled off and discarded and the spatula is removed from the mixing container (FIG. 5). To remove the spatula 20, the rear end of the spatula handle 2 is pressed down into the depression 17 to pivotally raise the head portion 21 of the spatula above the mixing chamber 12 so that it can be easily grasped and removed (FIG. 6).

Figure 7:
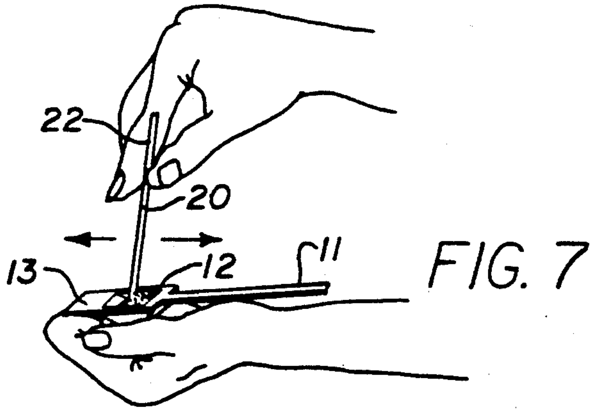

Pill type oral medications are crushed into a fine grain consistency or, in the case of capsule medications, the capsule is opened. The spatula can then be used to place the fine grain crushed medication into the mixing chamber containing the food product. Capsule contents may be poured into the mixing chamber. Using the head of the spatula, the medication is thoroughly mixed with the food product in the mixing chamber (FIG. 7).

Figure 8:
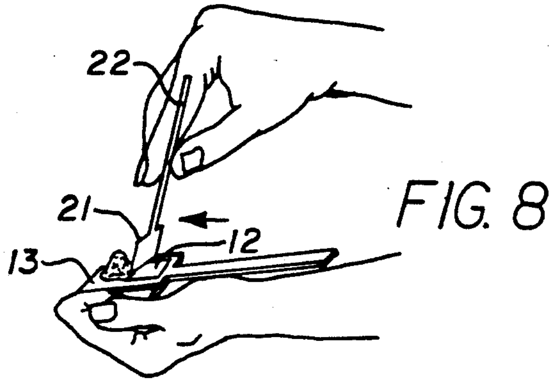

After thorough mixing, the head 21 of the spatula is inserted into the mixture at the rear wall of the mixing chamber and it is pushed forward to transfer the mixture onto the serving surface 13 at the forward end of the serving container (FIG. 8). The close fit of the spatula head with the interior of the mixing chamber and the curved front wall of the mixing chamber allows the mixing chamber to be substantially wiped clean and facilitates moving the mixture onto the serving surface.

The serving surface at the forward end of the serving container with the mixture thereon is placed in the recipient's mouth, and the mixture is wiped off on the inside of the recipient's cheek or onto their tongue. After administering the medication, the serving container is discarded.

While this invention has been described fully and completely with special emphasis upon a preferred embodiment, it should be understood that within the scope of the appended claims the invention may be practiced otherwise than as specifically described herein.

I claim:

1. An oral serving container apparatus for administering medicants to persons who have little or no control over the muscles of their mouth or have difficulty in swallowing pills comprising;

a generally rectangular serving container having a flat generally rectangular serving surface at a forward end, an open top recessed polygonal chamber adjoining said serving surface containing a measured amount of consumable food substance, and an integral rectangular handle portion extending longitudinally rearward therefrom and said chamber and handle portion having top surfaces shaped to receive a spatula member and a cover member, a flat generally rectangular spatula having a flat head portion and an integral flat handle portion extending longitudinally therefrom and sized to be removably received on said serving container with its handle portion engaged along said serving container handle portion and its head portion substantially covering the food substance contained in said chamber, and a removable thin flexible cover member peelably attached to the top surfaces of said serving container handle portion, said chamber, said serving surface, and said spatula and having outer peripheral portions extending beyond the top surfaces of said serving container, whereby said cover member may be peeled away from said serving container to gain access to said serving surface, said spatula, and the food substance contained in said chamber, and said spatula may be removed therefrom to be placed head down in the food substance and pushed forward to transfer the food substance from said chamber onto said serving surface, and thereafter said serving surface with said food substance thereon is placed in a recipient's mouth and said food substance is wiped off on the inside of the recipient's cheek or onto their tongue.

2. An oral serving container apparatus according to claim 1 wherein;

said recessed polygonal chamber has contiguous opposed side walls, a rear wall, a bottom wall, and a curved front wall which extends from said bottom wall to said serving surface in a smooth generally S-shaped curve and forms a rounded shoulder at its juncture with said bottom wall and said serving surface to facilitate the transfer of the food substance from said chamber to said serving surface as the spatula head is pushed forward.

3. An oral serving container apparatus according to claim 2 wherein;

said spatula head portion is a flat generally rectangular configuration having a width slightly less than the width of said polygonal chamber to be slidably received therein and its length is approximately the same length as the length of the open top of said chamber and the width of said spatula handle portion is smaller than the width of said head portion, and said serving container handle portion has a central narrow longitudinal recess extending along its top surface from said chamber rear wall, and said spatula handle portion is received in said serving container handle portion longitudinal recess to extend along said serving container handle portion and said spatula head portion substantially covers said chamber.

4. An oral serving container apparatus according to claim 3 wherein;

the bottom surface of said serving container handle portion longitudinal recess has a depressed portion at the rearward end thereof, and the rearward end of said spatula handle portion extends partially thereover when received in said serving container handle portion longitudinal recess, such that when the rearward end of said spatula handle portion is pressed downward its head portion will be pivotally raised above said chamber so that said spatula can be easily grasped and removed from said serving container.

5. An oral serving container apparatus according to claim 3 wherein;

the bottom corners of said chamber contiguous walls are rounded, and the outer corners of said spatula head portion are rounded to conform to the rounded bottom corners of said chamber whereby substantially all the contents of said concave recess can be effeciently and completely transferred from said chamber by the head portion of said spatula.

6. An oral serving container apparatus according to claim 3 wherein;

the outer edge of said spatula head portion is angled relative to its longitudinal axis to provide a transverse angled surface to engage said rounded shoulder of said chamber front wall in close fitting relation.

7. An oral serving container apparatus according to claim 1 wherein;

said flexible cover is formed of a generally rectangular strip of foil.

8. A method of providing and administering medicants to persons who have difficulty in swallowing oral medications comprising;

providing a generally rectangular prepackaged serving container having a recessed polygonal mixing chamber, a flat rectangular serving surface extending forwardly from the mixing chamber, and a handle portion extending rearwardly from the mixing chamber, the mixing chamber having contiguous opposed side walls, a rear wall, a bottom wall, and a curved front wall which extends from said bottom wall, and a curved front wall which extends from said bottom wall to said serving surface in a smooth generally S-shaped curve and containing a measured amount of food product, and said container including a flat generally rectangular mixing spatula removably carried along a top surface of said serving container which has a flat head portion substantially covering the contents of said mixing chamber, and further including a removable flexible cover peelably attached to the top surface of the serving container and covering said serving surface, said chamber, and said spatula and forming an air tight seal for the serving container and its contents, peeling said cover off said serving container and removing said spatula therefrom, providing a fine grain or powdered oral medication and placing same into said mixing chamber, thoroughly mixing said oral medication with said food product in said mixing chamber with said spatula, inserting the head of said spatula into the mixture at the rear wall of said mixing chamber and pushing it forward along said bottom wall and said curved front wall to transfer substantially all the mixture onto said serving surface at the forward end of said serving container, and placing said serving surface at the forward end of said serving container with said mixture thereon in the recipient's mouth, and wiping the mixture off on the inside of the recipient's cheek or onto their tongue.

9. The method according to claim 8 wherein said step of proving a fine grain oral medication comprises crushing a pill type oral medication into a fine grain consistency.

10. The method according to claim 8 wherein said step of providing a powdered oral medication comprises opening a capsule type oral medication and emptying the contents thereof.

* * * * *